J. CARPENTER.
Iron Fence-Post.
No. 9,005. Reissued Dec. 30, 1879.
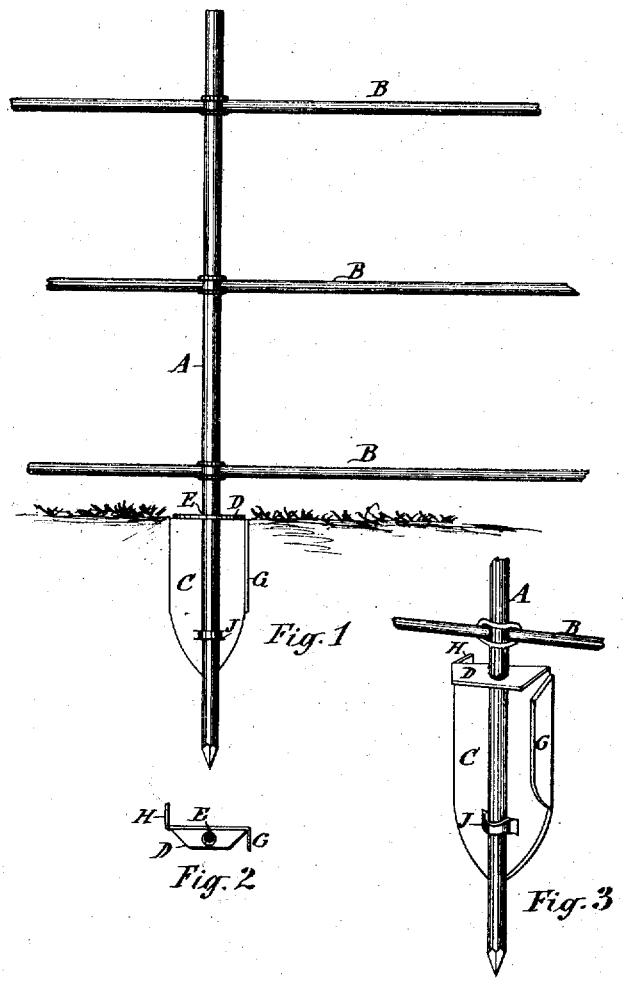
ATTEST:
E. Laass
E. Bendixen.
INVENTOR:
James Carpenter
per Duell, Laass & Hy
attorneys

UNITED STATES PATENT OFFICE.

JAMES CARPENTER, OF NEW HOPE, NEW YORK.

IMPROVEMENT IN IRON FENCE-POSTS.

Specification forming part of Letters Patent No. 218,229, dated August 5, 1879; Reissue No. 9,005, dated December 30, 1879; application filed September 29, 1879.

*To all whom it may concern:*

Be it known that I, JAMES CARPENTER, of New Hope, in the county of Cayuga and State of New York, have invented new and useful Improvements in Fence-Posts, of which the following, taken in connection with the accompanying drawings, is a full, clear, and exact description.

This invention relates to an improved anchoring device designed to be applied to an iron fence-post after it is driven into the ground and effectually brace the said post from swaying in any direction, and which also is readily withdrawn from the ground separately from the post whenever the latter is desired to be moved.

The following description will enable others skilled in the art to make and use my invention.

In the accompanying drawings, Figure 1 shows the invention in position for bracing the post. Fig. 2 is a plan view of same, and Fig. 3 a detail view in perspective.

Similar letters of reference indicate corresponding parts.

A represents the fence-post, consisting of an iron bar of any desired shape in cross-section. B B are the fence-wires connected thereto.

The post A, when driven into the ground, is, on account of the small bearing-surface it presents to the material surrounding it, liable to yield to the strain incident to the pressure of wind and other sources, and thus be thrown out of range of the fence, or be drawn out of its vertical position during the process of applying the wires B B. To overcome these difficulties I provide a vertically-elongated cast or wrought iron blade or spade, C, pointed at its lower end to facilitate its penetrating the ground, and having near the said end a hasp or loop, J, and at its upper extremity a horizontal flange or offset, D, with an aperture, E, through which hasp and flange the post A passes.

The upper flange, D, forms a shoulder upon which to apply the strokes required for driving the blade into the ground, and which also admits of inserting underneath it a lever for raising it out of the ground preparatory to the removal of the post when desired.

By means of vertical offsets or flanges G and H, projecting from the blade C, the said blade is made to present opposing surfaces in the direction of the line of the fence, as well as at right angles thereto, and by the connection of both extremities of the blade and its contiguity to the post the parts are maintained parallel to each other, and the latter is thoroughly braced.

The method of applying the blade C to the post is as follows: The post A is first driven into the ground a certain distance—say about two feet. The blade or spade C is then caused to slide down on the same by passing the post through the hasp J and through the opening E in the top flange, D. The blade thus guided is then driven into the ground by means of a wooden block or some other suitable means until it is in the position shown in Fig. 1 of the drawings.

The best way to drive down this blade is to make a hole through a heavy wooden block, slide the block over the post, and then use it in the manner of a pile driver.

The advantages of the employment of the blade C in connection with the post A are the following: It is simple and cheap in construction, readily applied to the post, prevents all swaying of the same, rendering the post as firm in the ground as a wooden post, and at the same time admits of a ready removal of the post, and avoids all inconvenience and expense incident to rotting.

Having thus described my invention, what I claim as new, and desire to secure by Letters Patent, is—

1. The improved post-anchoring device, consisting of a vertically-elongated blade having vertical flanges or offsets, and loosely connected with the post at or near both extremities of the blade, and provided at its upper extremity with a horizontal offset for the reception of the strokes required for driving the said blade after the driven post, substantially in the manner set forth and described.

2. The combination of the post A with the blade C, having flanges D H G and hasp J, substantially as and for the purpose specified.

In testimony whereof I have hereunto signed my name in the presence of two attesting witnesses at Syracuse, in the county of Onondaga and State of New York, this 12th day of September, 1879.

JAMES CARPENTER. [L. S.]

Witnesses:
E. LAASS,
S. B. CASTLE.